United States Patent [19]

Matsushita et al.

[11] Patent Number: 4,899,569

[45] Date of Patent: Feb. 13, 1990

[54] METHOD FOR MANUFACTURING A ROTOR FRAME OF AN ELECTROMAGNETIC CLUTCH

[75] Inventors: Takashi Matsushita; Kozaburo Tsuchiya, both of Isesaki, Japan

[73] Assignee: Sanden Corporation, Gunma, Japan

[21] Appl. No.: 315,848

[22] Filed: Feb. 27, 1989

[30] Foreign Application Priority Data

Feb. 29, 1988 [JP] Japan ............................ 63-46109

[51] Int. Cl.$^4$ ........................ B21D 28/32; B21D 53/26
[52] U.S. Cl. ...................................... 72/336; 72/339; 72/340; 72/379; 29/894
[58] Field of Search ................... 72/334–336, 72/339, 340, 379, 356, 359, 358; 29/159 R; 192/84 C

[56] References Cited

U.S. PATENT DOCUMENTS

| | | | |
|---|---|---|---|
| 736,551 | 8/1903 | Roemer | 29/159 R |
| 866,021 | 9/1907 | Hansen | 72/358 |
| 1,486,365 | 3/1924 | Cummings | 29/159 R |
| 3,399,560 | 9/1968 | Connolly et al. | 72/356 |
| 4,314,472 | 2/1982 | Saegusa et al. | 72/340 |
| 4,552,005 | 11/1985 | Matsushita | 72/348 |
| 4,553,690 | 11/1985 | Nakamura | 29/159 R |
| 4,564,137 | 1/1986 | Nakamura | 29/159 R |
| 4,669,295 | 6/1987 | Koitabashi | 72/340 |

FOREIGN PATENT DOCUMENTS

| | | | |
|---|---|---|---|
| 488780 | 12/1952 | Canada | 72/358 |
| 1109046 | 1/1956 | France | 72/359 |
| 47055 | 4/1979 | Japan | 192/84 C |
| 77955 | 6/1980 | Japan | 29/159 R |
| 179430 | 11/1982 | Japan | 192/84 C |
| 81536 | 5/1983 | Japan | 29/159 R |

Primary Examiner—Daniel C. Crane
Attorney, Agent, or Firm—Banner, Birch, McKie & Beckett

[57] ABSTRACT

A method for manufacturing a rotor frame of an electromagnetic clutch is disclosed. A rotor frame is manufactured using press machines in a sequential process of: (1) forming a blank which has the shape of a regular polygon; (2) forming a bulge in one side of the blank; (3) making a hole in the center of the bulge; and (4) bending the walls of the bulge and the blank edges into projections that can be machined to provide appropriately shaped end surfaces for use as a rotor frame.

9 Claims, 8 Drawing Sheets

METHOD FOR MANUFACTURING A ROTOR FRAME OF AN ELECTROMAGNETIC CLUTCH

BACKGROUND OF THE INVENTION

1. Field of the Invention

The present invention relates to an electromagnetic clutch, more particularly, to a method for manufacturing a rotor frame of an electromagnetic clutch that can be used in an automobile air conditioning system.

2. Description of the Prior Art

In Japanese Patent Application Publication No. 57-40126, a method for manufacturing a rotor frame of an electromagnetic clutch is disclosed. This method comprises forming a rotor frame by cold forging from a ring-shaped lump of iron. However, shaping an appropriately large ring of iron requires a large, expensive forging machine that can provide the required manufacturing pressures which are typically on the order of 1,500 to 2,000 tons. It would be desirable to have a manufacturing method that does not require high manufacturing loads and heavy equipment.

SUMMARY OF THE INVENTION

It is an object of this invention to manufacture the rotor frame of an electromagnetic clutch using a press machine. Press machines do not require large manufacturing loads thereby reducing the machine size and manufacturing costs.

A method for manufacturing the rotor frame according to the invention comprises:

forming a blank exhibiting a regular polygon shape from an iron plate, the blank having a top surface, edges, and a central area;

forming a convexly curved bulge in the central area of the blank;

forming a first annular projection at the edges of the blank, the first annular projection being oriented in a projection axis that is substantially perpendicular to the top surface of the blank;

removing at least a center portion of the bulge to form a hole in the blank surrounded by curving annular walls;

expanding the hole and bending the curving walls to form a second annular projection oriented in a direction substantially parallel to the first annular projection;

extending the first annular projection along the projection axis; and machining end surfaces into the first and second annular projections.

DETAILED DESCRIPTION OF THE PREFERRED EMBODIMENT

Figure 1:
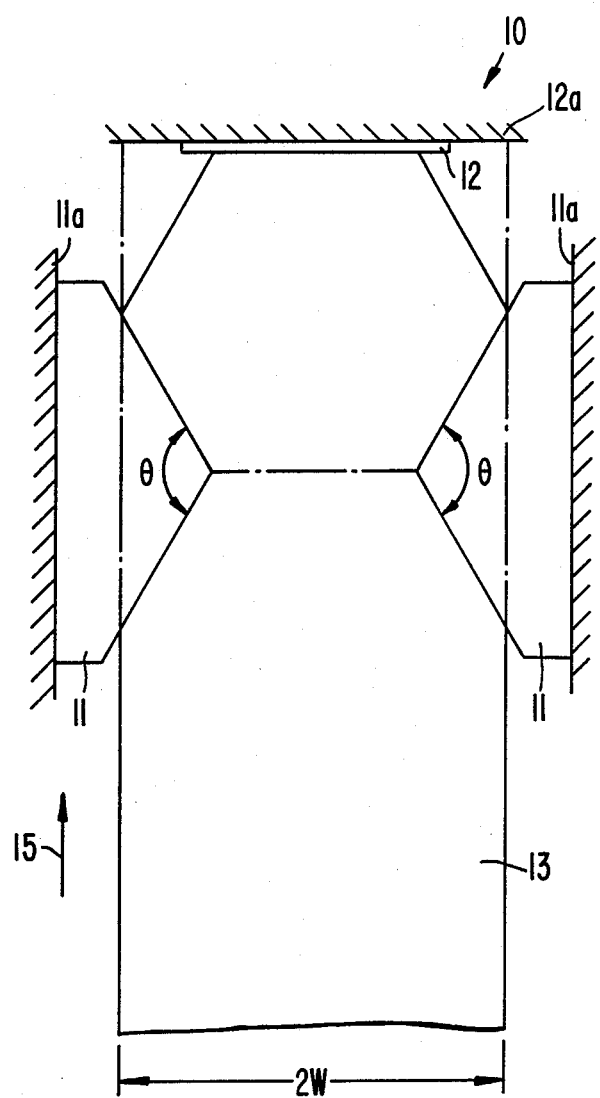
FIG. 1 is a schematic view which shows a stamping out process for obtaining a hexagonal blank from an iron plate in accordance with one embodiment of the present invention.

With reference to FIG. 1, stamping machine 10 includes cutting blades 11 and 12 in cooperation with guide members 11a and 12a along which cutting blades 11 and 12 are able to be moved vertically. Guide members 11a face each other in parallel planes while guide member 12a is perpendicular to guide members 11a and acts to block one end of plate 13. Cutting blades 11 are arranged to have an interior angle of about 120° for producing a blank having six equal sides, although other angles and shapes may be used in accordance with the invention. Blanks having three or more sides can be used, but it is preferable to use blanks having six to twelve sides. For simplicity, the invention is described with reference to six-sided blanks. Cutting blade 12 is straight.

Figure 2:
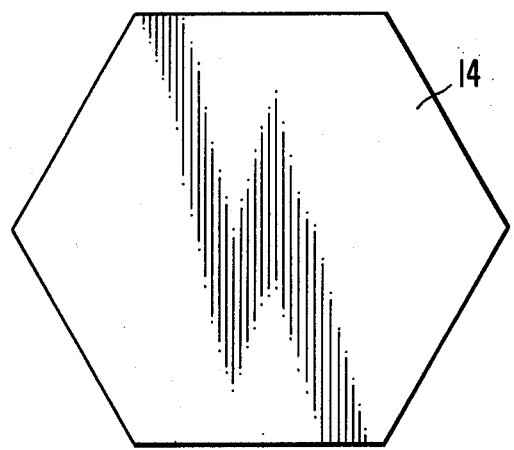
FIG. 2 is a top view of a regular hexagonal blank.

Accordingly, regular hexagonal blank 14 shown in FIG. 2 can be continuously stamped out from iron plate 13. Plate 13 can be of many sizes but is preferably long and rectangular. For example, plates having a width of 2W (W=154 mm) can be formed in sequential fashion into a blank by pressing blades 11 and 12 and then advancing iron plate 13 toward blade 12 as indicated by arrow 15 a distance of $\sqrt{3} \cdot W$. This process can easily produce blanks 14 with a good yield and little waste.

Figure 3:
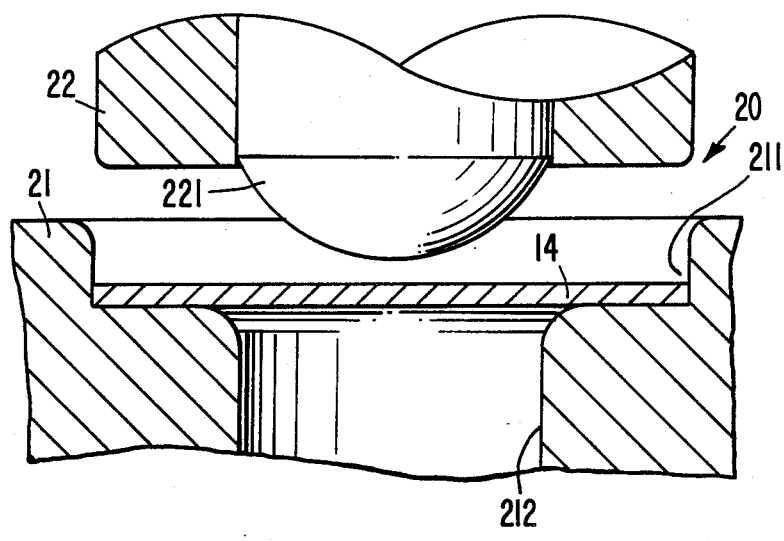
FIGS. 3 and 4 illustrate a pressing process for forming the bulge in the central portion of the blank illustrated in FIG. 2.
Figure 4:
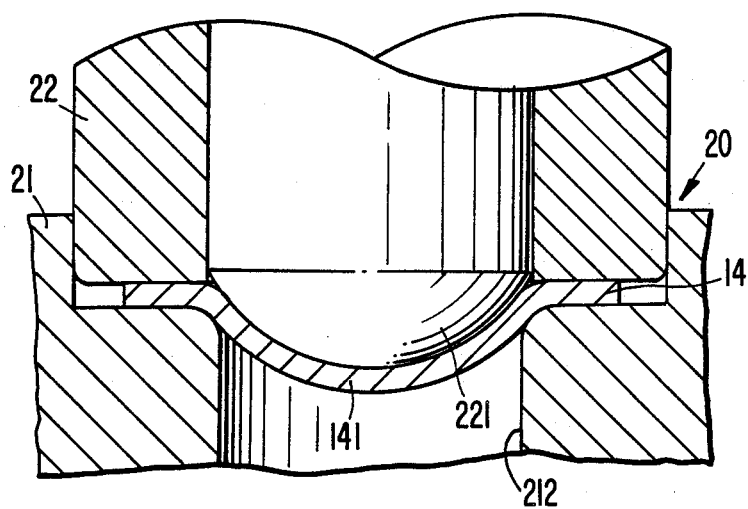

With reference to FIGS. 3 and 4, first press machine 20 can be used to produce a convex bulge in the central portion of blank 14. Press machine 20 includes lower mold 21 having recess 211 shaped to fit blank 14 and upper mold 22 having a hemispherical portion 221 having a first radius of curvature. Opening 212 in lower mold 21 is sized to receive the projection of hemispherical portion 221 and the metal thickness therein when blank 14 is disposed between molds 21 and 22. Recess 211 is formed in the upper surface of lower mold 21 and is dimensioned to be slightly larger than blank 14. A tapering geometry may be used to center the blank further.

In operation, convex bulge 141 can be formed in blank 14 as follows: First, blank 14 is disposed in recess 211. Then, upper mold 22 is moved downwardly until the hemispherical portion 221 contacts blank 14. Thereafter, upper mold 22 continues to be forced downwardly causing a convexly curved bulge in blank 14 to be formed around hemispherical portion 221. This deformation causes the edges of blank 14 to draw inwardly and away from the walls of recess 211 because the thickness of blank 14 remains substantially unchanged. Curved edges at the appropriate places on lower mold 21 facilitate bending of blank 14 rather than creasing or fracturing.

Figure 5:
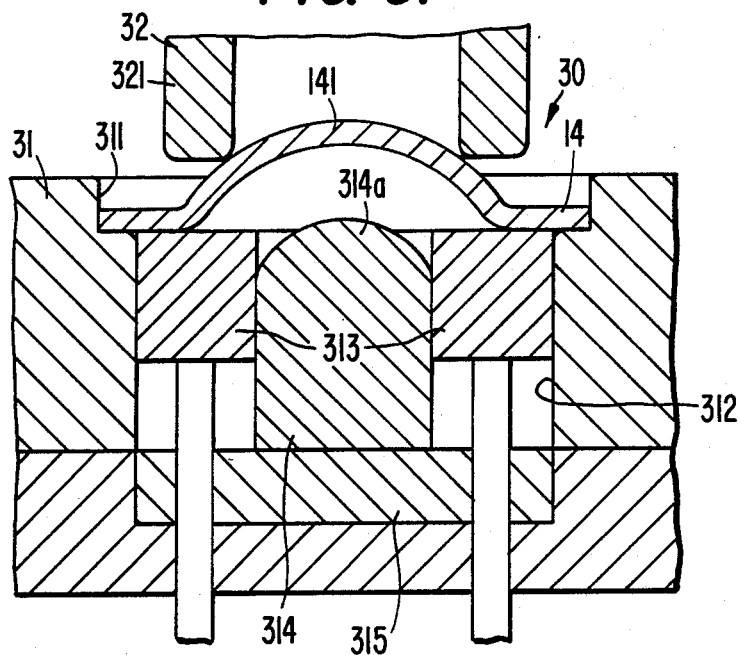
FIGS. 5 and 6 show a process for forming a first annular projection at the bulge side surface of the blank of FIG. 4.
Figure 6:
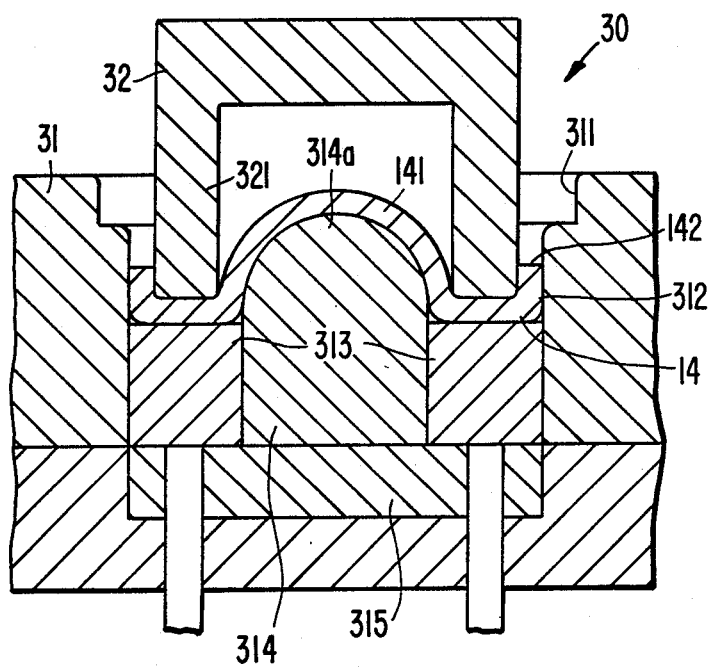

With reference to FIGS. 5 and 6, second press machine 30 can be used to form first annular projection 142 at the edges of blank 14. Second press machine 30 includes lower mold 31 having recessed portion 311 shaped to fit the convexly bulged blank 14. Upper mold 32 has annular projection 321 of a width less than the width of recessed portion 311 and cylindrical cavity 312. The width difference between projection 321 and recessed portion 312 is desirably about twice the thickness of blank 14. Cylindrical cavity 312 is formed in lower mold 31 to receive ring-shaped, displaceable mold 313 and column member 314.

Ring-shaped mold 313 is provided with an oil pressure damper (not shown) at a lower portion thereof to control the downward descent of mold 313 in response to a downward load produced by upper mold 32. Column member 314 is disposed within the center of ring-shaped mold 313 and includes hemispherical portion 314a at a top side thereof and having a second radius of curvature facing upper mold 32. The radius of curvature of portion 314a is preferably less than the radius of curvature of portion 221.

First annular projection 142 is formed as follows: Bulged blank 14 is removed from press machine 20 and turned over so that the bulge is in an upward direction in recessed potion 311. Upper mold 32 is moved and forced down around bulged blank 14 and against mold 313 until the bottom of ring-shaped mold 313 is moved down into contact with stop member 315 disposed at a bottom of cylindrical cavity 312. As a result of this motion, first annular projection 142 is formed at the edges of blank 14 between projection 321 and cylindrical cavity 312 facing upwardly in the same direction as the convex displacement of the bulge in blank 14. This process is termed "drawing" as used herein. Simultaneously, bulge 141 is further curved to assume a curved bulge having the smaller radius of curvature of hemisphere portion 314a. As illustrated in FIG. 6, this smaller radius of curvature results in curved wall portions adjacent the surface of blank 14 that are more nearly perpendicular to the blank surface than before the bending.

Figure 7:
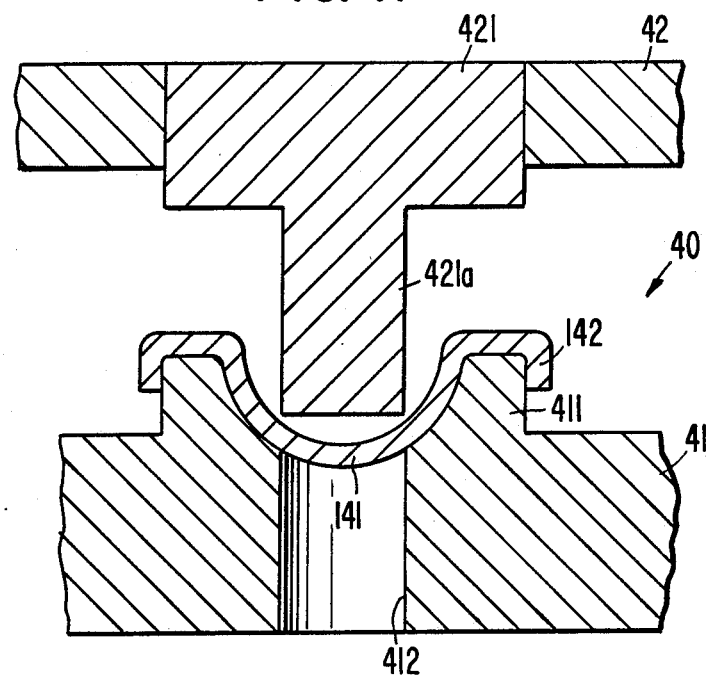
FIGS. 7 and 8 show a punching process for forming the hole in the bulge.
Figure 8:
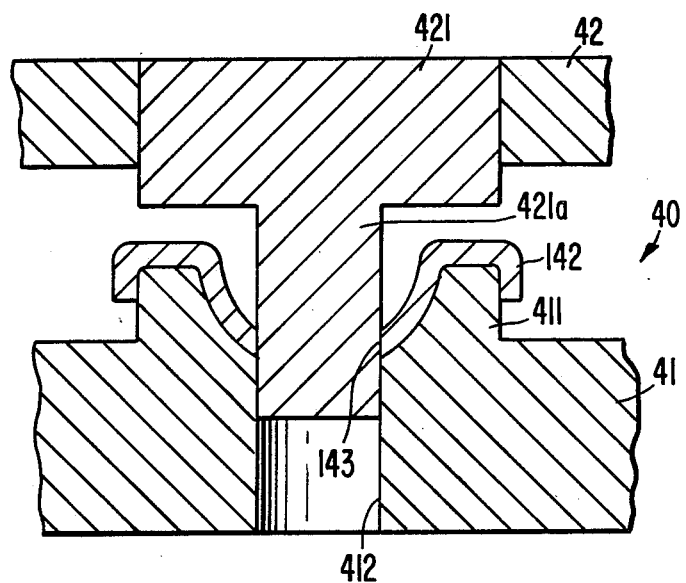

With reference to FIGS. 7 and 8, third press machine 40 can be used to form hole 143 in the center of bulge 141. Third press machine 40 includes lower mold 41 having lateral support 411 around cylindrical cavity 412. Upper mold 42 has punch 421 which includes column portion 421a projecting downwardly therefrom. The upper surface of lateral support 411 is shaped to fit blank 14 with bulge 141 and first annular projection 142. Cylindrical cavity 412 is dimensioned to receive column portion 421a after column portion 421a acts as a punch to remove the center of bulge 141 and form hole 143.

Hole 143 is formed as follows: Blank 14 is removed from second press machine 30 and turned over so that the bulge is oriented downwardly and placed on support 411. Upper mold 42 moves down until column portion 421a punches through the central area of bulge 141 and into cylindrical cavity 412 (FIG. 8).

Figure 9:
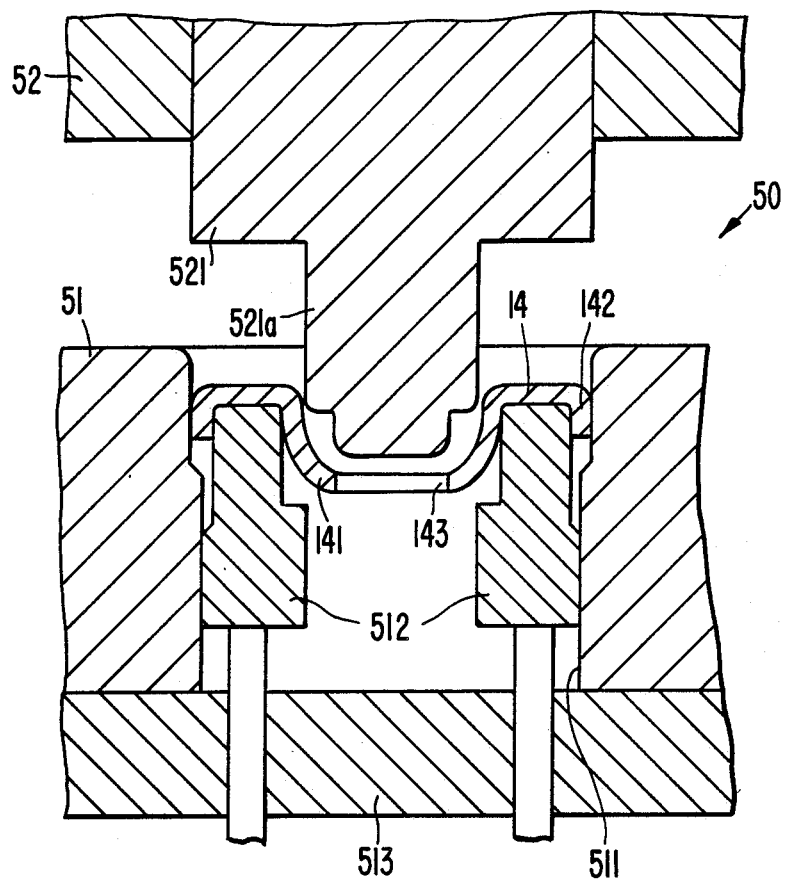
FIGS. 9 and 10 show a process for transforming the blank from FIG. 8 into a second annular projection and reducing the thickness of the first annular projection in a plane perpendicular to the projection axis of the second annular projection.
Figure 10:
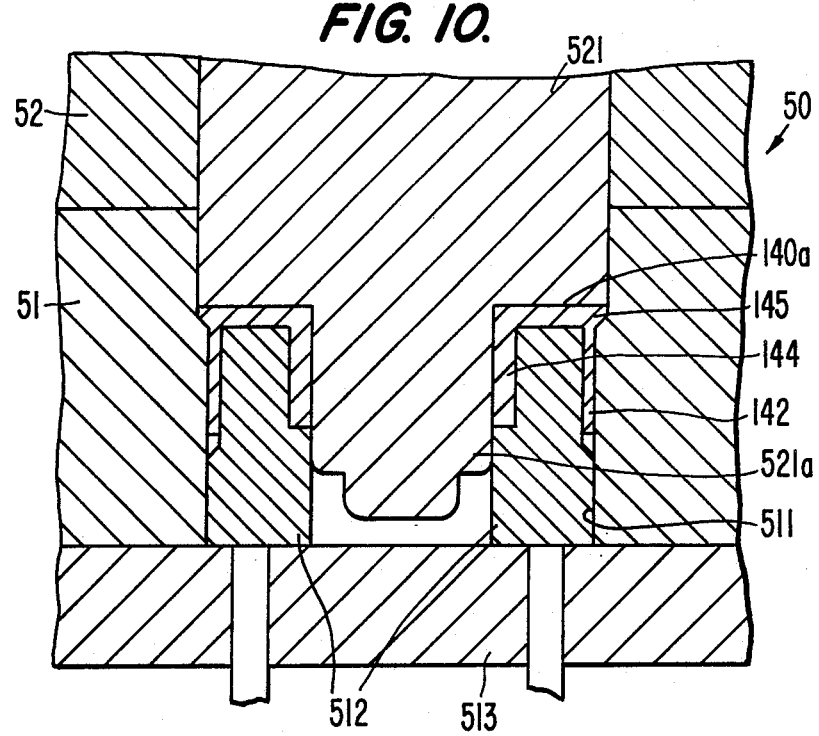

With reference to FIGS. 9 and 10, fourth press machine 50 for generally forming rotor frame 140a is shown. Fourth press machine 50 includes lower mold 51 having cylindrical cavity 511 and upper mold 52 having hole expansion and shaping member 521. Ring-shaped mold 512 is slidably disposed within cavity 511 and is provided with an oil pressure damper (not shown) at a lower portion thereof to control the descent of mold 512 in response to a downward load from displacing upper mold 52. Member 521 includes column portion 521a which fits through the center of ring-shaped mold 512.

Rotor frame 140a is generally formed as follows: Ring-shaped, bulged blank 14 is removed from third press machine 40 and placed on ring-shaped mold 512. First annular projection 142 will fit in an appropriately shaped spacing between mold 512 and the inner wall of cavity 511. Upper mold 52 then moves down until the bottom of ring-shaped mold 512 contacts stop member 513 included in lower mold 51. As a result of this movement, hole 143 is expanded around column portion 512a, and the lateral curving walls of bulge 141 are straightened to be substantially parallel to first annular projection 142 and form second annular projection 144. Simultaneously with the hole expansion, first annular projection 142 is forced into a relatively thinner space between mold 512 and cavity 511. This causes the wall thickness of projection 142 to reduce. Radial annular projection 145 is also formed during the extension of projection 142 by deformation into an appropriate recess of lower mold 51 as shown in FIG. 10. Radial annular projection 145 will be appropriately shaped to converge magnetic flux during the excitation of an electromagnet in an electromagnetic clutch.

Figure 11:
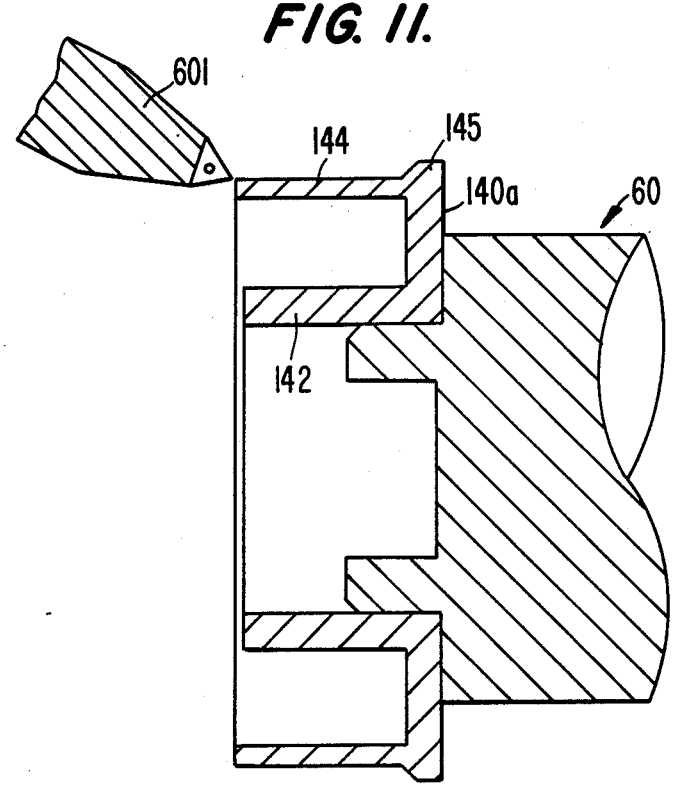
FIG. 11 depicts a process for machining axial end surfaces in the first and second annular projections.

As a final step, formed rotor frame 140a is removed from fourth press machine 50 and attached to cutting machine 60. On machine 60, axial end surfaces are formed into both first and second annular projections 142 and 144 by cutting tool 601 as shown in FIG. 11. The appropriate shape of end surfaces is within the existing skill in this art.

Of the processing apparatus useful in the instant process, fourth press machine 50 is the one which would require the largest loading capability. For example, fourth press machine 50 would use only 600 tons of force while machines 10, 20, 30 and 40 would use far less. Such reduced force requirements translates into machines that are less expensive and lighter than cold forging units thereby making the process more economical.

Figure 12:
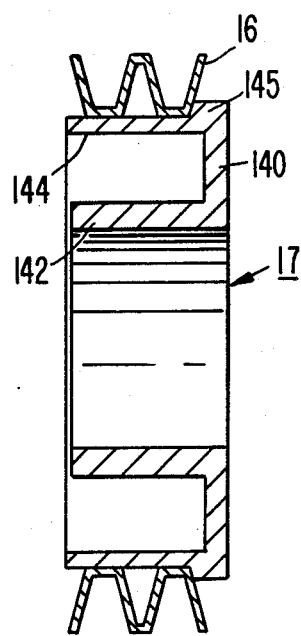
FIG. 12 is a longitudinal sectional view of a rotor frame mounted with a pulley member.

FIG. 12 shows rotor member 17 having pulley 16 mounted on rotor frame 140.

Figure 13:
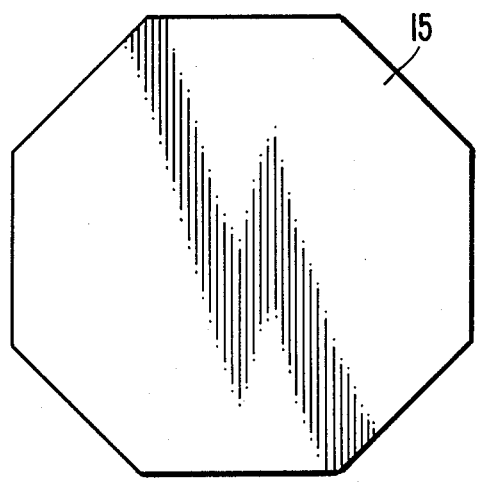
FIG. 13 is a view of an octagonal blank that can be made and used in accordance with the present invention.

FIG. 13 shows regular octagonal blank 15 that can be stamped out from a length of iron plate. Octagonal blank 15 can be made with a better yield than hexagonal blank 14 and should be considered as within the scope of the invention as well as any other blank exhibiting a regular polygon shape.

The illustrations and discussion thereof have related to merely one embodiment within the scope and spirit of the invention. It is to be understood that the drawings are to be used as a guide to understanding the invention and should not act to limit the scope of the appended claims.

We claim:

1. A method for manufacturing a rotor frame for an electromagnetic clutch, said method comprising:
  forming a blank exhibiting a regular polygon shape from an iron plate, said blank having a top surface, edges, and a central area;
  forming a convexly curved bulge in said central area of said blank, said bulge having a dome shape with a first radius of curvature;
  forming a first annular projection at said edges in said bulged blank, said first annular projection being oriented in a projection axis substantially perpendicular to the top surface of said blank;
  removing at least a center portion of said bulge to form a hole in said blank surrounded by curving annular walls;
  expanding said hole and bending said curving walls of dome shape to form a second annular projection oriented in a direction substantially parallel to said first annular projection;

extending said first annular projection along said projection axis; and machining end surfaces into the first and second annular projections.

2. The method of claim 1 comprising forming said convexly curved bulge by pressing.

3. The method of claim 1 further comprising forming said first annular projection and simultaneously forming said convexly curved bulge into a bulge having a smaller radius of curvature than said first radius of curvature.

4. The method of claim 1 comprising forming said hole by punching.

5. The method of claim 1 comprising transforming said holed bulge to a second annular projection by contacting said curving walls with an expansion and shaping member.

6. The method of claim 1 comprising forming a blank exhibiting a regular hexagon shape.

7. The method of claim 1 comprising forming a blank exhibiting an octagon shape.

8. The method of claim 1 comprising reducing the thickness of said first annular projection during the extending step.

9. The method of claim 1 comprising:
forming a radial annular projection at an outer base portion of said first annular projection during the extending step and being shaped to converge magnetic flux when used in an electromagnetic clutch.

* * * * *